United States Patent
Ali et al.

(10) Patent No.: US 12,118,328 B2
(45) Date of Patent: *Oct. 15, 2024

(54) IN-MEMORY BIT-SERIAL ADDITION SYSTEM

(71) Applicant: Purdue Research Foundation, West Lafayette, IN (US)

(72) Inventors: Mustafa Ali, Mountain View, CA (US); Akhilesh Jaiswal, Santa Ana, CA (US); Kaushik Roy, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,528

(22) Filed: Jun. 3, 2023

(65) Prior Publication Data
US 2023/0305804 A1    Sep. 28, 2023

Related U.S. Application Data

(63) Continuation of application No. 17/071,930, filed on Oct. 15, 2020, now Pat. No. 11,669,302.

(60) Provisional application No. 62/916,225, filed on Oct. 16, 2019.

(51) Int. Cl.
*G06F 7/505*    (2006.01)
*G06F 7/491*    (2006.01)
*G06F 7/74*     (2006.01)
*G06F 17/16*    (2006.01)

(52) U.S. Cl.
CPC .......... *G06F 7/5052* (2013.01); *G06F 7/4912* (2013.01); *G06F 7/74* (2013.01); *G06F 17/16* (2013.01)

(58) Field of Classification Search
CPC .. G06F 7/50–5095; G06F 7/4912; G06F 7/74; G06F 2207/4822; G06F 17/16
See application file for complete search history.

(56) References Cited

U.S. PATENT DOCUMENTS 11,043,259 B2 * 6/2021 Wentzlaff ............... H03K 19/21

OTHER PUBLICATIONS

Angizi et al., GraphiDe: A Graph Processing Accelerator leveraging In-DRAM-Computing. In Proceedings of Great Lakes Symposium on VLSI 2019, Tysons Corner, VA, USA, May 9-11, 2019 (GLSVLSI '19), 6 pages, https://doi.org/10.1145/3299874.3317984 (Year: 2019).*

* cited by examiner

*Primary Examiner* — Andrew Caldwell
*Assistant Examiner* — Carlo Waje
(74) *Attorney, Agent, or Firm* — Piroozi-IP, LLC

(57) ABSTRACT

An in-memory vector addition method for a dynamic random access memory (DRAM) is disclosed which includes consecutively transposing two numbers across a plurality of rows of the DRAM, each number transposed across a fixed number of rows associated with a corresponding number of bits, assigning a scratch-pad including two consecutive bits for each bit of each number being added, two consecutive bits for carry-in ($C_{in}$), and two consecutive bits for carry-out-bar ($\overline{C_{out}}$), assigning a plurality of bits in a transposed orientation to hold results as a sum of the two numbers, for each bit position of the two numbers: computing the associated sum of the bit position; and placing the computed sum in the associated bit of the sum.

20 Claims, 13 Drawing Sheets

IN-MEMORY BIT-SERIAL ADDITION SYSTEM

CROSS-REFERENCE TO RELATED APPLICATIONS

The present patent application is a continuation of U.S. Non-Provisional patent application Ser. No. 17/071,930, filed Oct. 15, 2020, which is related to and claims the priority benefit of U.S. Provisional Patent Application Ser. No. 62/916,225, filed Oct. 16, 2019, the contents of each of which are hereby incorporated by reference in its entirety into the present disclosure.

STATEMENT REGARDING GOVERNMENT FUNDING

None.

TECHNICAL FIELD

The present disclosure generally relates to memory, and in particular, to in-memory computation.

BACKGROUND

This section introduces aspects that may help facilitate a better understanding of the disclosure. Accordingly, these statements are to be read in this light and are not to be understood as admissions about what is or is not prior art.

Most modern-day computing systems store the largest portion of data in Dynamic Random Access Memory (DRAM) usually termed as the system main memory. DRAM is less expensive but is slower as compared to SRAM which is much faster but is more costly. As a result, a central processing unit's (CPU's) speed-sensitive operation are performed on an SRAM and larger system operations are retained for DRAM. Both SRAM and DRAM are volatile (i.e., when power is removed from the system, the data held in these memory structures will be lost); however, DRAM requires periodic refresh to avoid corruption of data. In its simplest form, a DRAM cell is simply a transistor coupled to a capacitor, thereby making it most economical to manufacture, as millions of these cells can be placed on a semiconductor chip in a high density formation.

The main memory and processing cores are spatially distant from each other forming what is known as the von-Neumann Architecture, described further below. For decades, the processing capability has been constantly increasing, yet, the memory latency has failed to keep up the pace with the increased compute throughput. As a result, the memory access operation has dominated the computation and energy bandwidth, leading to a system bottleneck, also known as the von-Neumann bottleneck. With emerging data-intensive computing applications, the problem is further aggravated due to expenditure of large fraction of system-energy on the movement of data between the main memory and the processing cores. To enable energy-efficient computations in von-Neumann machines, traditionally, transistor scaling leading to improved performance, energy, and memory capacity has been exploited. However, transistor scaling has recently slowed down due to cost as well as physical limitations associated with dimensional scaling.

The traditional architecture is often referred to as the von-Neumann architecture, after its inventor. According to this architecture a computer includes (i) a processor, (ii) memory, and (iii) other peripheral components. This architecture is based on decoupling the memory from the processor, and is found in millions of computers worldwide. A schematic of this architecture 1 is shown in FIG. 9, where a memory 2 is decoupled from the processor 4, and where the memory 2 and the processor 4 communicate via data exchange bus 6. While there has been an explosion of computing powers using this architecture, it is now failing to answer the call of data exchange in such applications as big-data, artificial intelligence, Internet-of-things (IoT), and other data intensive operations. The shortcoming of this architecture is mainly due to a bottleneck 8 found between the memory 2 and the processor 4. This bottleneck 8 mainly arises from a limited data transfer rate between these two physically decoupled units. There are two major challenges with this bottleneck: (1) cycle time needed for data transfer (i.e., throughput), and (2) energy consumption associated with data transfer. To combat these two drawbacks associated with the bottleneck 8, one approach investigated in the prior art is to utilize in-memory vector computations. Towards this end, researchers have been exploring alternate paradigms such as compute-in-memory to cope up with the requirement for high throughput computations despite the slowdown in dimensional scaling. In such cases, not only does the decoupled memory maintain data it also provides rudimentary logic operations. These in-memory operations, thus, remove some of the issues associated with the bottleneck 8 as (1) data transfer between the memory 2 and the processor 4 is reduced, and (2) consequently energy consumption is also reduced.

As a result, compute-in-memory is an emerging paradigm, wherein the computing system is redesigned to process data at its storage in the memory, thereby, minimizing the expensive movement of data. In-memory computing proposals have been conceptualized for decades. Recently, on-chip SRAM caches have been redesigned to perform computations like bitwise Boolean functions, arithmetic operations, and dot product computations in SRAM arrays. For instance, in one prior art implementation, Neural Cache repositions cache structures as parallel compute units running arithmetic operations (addition and multiplication). Additionally, Neural Cache shows the ability to accelerate deep neural network inference through proper data mapping and in-cache arithmetic operations. Similarly, binary neural networks have shown improved energy and performance metrics using in-memory dot products in modified SRAM cells. Indeed, computing in SRAM caches improves the throughput and the energy consumption by minimizing data movements between the processor and cache. However, the working data sizes in data-intensive applications such as neural networks and machine learning might be much larger than the available on-chip SRAM cache capacities. Therefore, DRAM is a promising candidate to exploit in-place, in-memory computations for high throughput data intensive applications. One particular example of processing-in-memory scheme (perhaps better categorized as 'near-memory' computing) with DRAM is moving computing logic blocks closer to 3D stacked DRAM through stacking a logic die on top of 3D DRAM dies,. Such schemes improve both latency and throughput without changing the DRAM design itself. Unfortunately, the logic die in 3D-stacked DRAM does not allow the most optimized use of the available internal memory bandwidth of a DRAM chip. To exploit the maximum internal bandwidth of DRAM, computation blocks must be on the same DRAM die enabling computation within the memory array. However, building complicated logic circuitry on die within the array structure is a rather challenging task in DRAM process technology. Researchers, therefore, have attempted to enable in-memory computation using functional read on the local bit-lines in the DRAM array. Several in-memory computing primitives using DRAM technology have been reported recently. RowClone, one such reported prior art, performs bulk copy and data initialization inside the DRAM chip. Ambit, another such reported prior art, exploits triple-row activation for performing bulk bit-wise operations between data in the same sub-array with negligible area overhead. DRISA, yet another reported prior art, proposes four different in-DRAM computing microarchitectures for arithmetic operations. Three of the proposed DRISA microarchitectures adopt the standard one transistor-one capacitor (1T1C) cell and modify the sensing peripherals, while one DRISA scheme adopts the less-dense one transistor-one capacitor (3T1C) cell. Note, DRISA schemes suffer from large area cost (the minimum area overhead is 77% of standard DRAM). DrAcc, still yet another reported prior art, is an in-DRAM addition primitive that is built on top-of Ambit to perform arithmetic addition with 2% area overhead. Note, both DRISA and DrAcc depend on shifting circuits to shift the carry bits during addition across bit-lines leading to significant latency during vector addition operations.

Therefore, there is an unmet need for a novel approach to perform simple vector arithmetic operations that is compatible with existing DRAM architecture with minimum associated latency.

SUMMARY

An in-memory vector addition method for a dynamic random access memory (DRAM) is disclosed which includes consecutively transposing two numbers across a plurality of rows of the DRAM, each number transposed across a fixed number of rows associated with a corresponding number of bits, assigning a plurality of compute rows in the same transpose manner including two consecutive bits for each bit of each number being added, two consecutive bits for carry-in ($C_{in}$), and two consecutive bits for carry-out-bar ($\overline{C_{out}}$). The method further includes assigning a plurality of bits in the same transpose manner to hold results as a sum of the two numbers. For each bit position of the two numbers the method includes: determining associated sum (S) of the associated bit positions of the two numbers, and placing the determined associated sum in the associated bit of the sum. The determination of the associated sum is based on determining a $C_{out}$ and $\overline{C_{out}}$ and recording the determined $C_{out}$ and $\overline{C_{out}}$ in associated bit positions of the plurality of compute rows. $C_{out}$ associated with determination of the associated sum of one bit is used as $C_{in}$ for determination of the associated sum of a next bit.

A dynamic random access memory (DRAM) capable of in-memory vector addition is also disclosed which includes a DRAM comprising a data addition area having a plurality of rows, each row including a plurality of columns, a first subset of the rows of the plurality of the data addition rows assigned to hold consecutively transposed two numbers across a first column, each number transposed across a fixed number of rows of the first subset associated with a corresponding number of bits, a second subset of the rows of the plurality of the data addition rows assigned as summation result rows across the first column associated with the addition of the two numbers, a third subset of the rows of the plurality of the data addition rows assigned as compute rows across the first column including two consecutive bits for each bit of each number being added, two consecutive bits for carry-in ($C_{in}$), and two consecutive bits for carry-out-bar $\overline{C_{out}}$, and a memory controller. The memory controller is configured to for each bit position of the two numbers determine associated sum (S) of the associated bit positions of the two numbers; and place the determined associated sum in the associated bit of the sum. The determination of the associated sum is based on determining a $C_{out}$ and $\overline{C_{out}}$ and recording the determined $C_{out}$ and $\overline{C_{out}}$ in associated bit positions of the plurality of compute rows. $C_{out}$ associated with determination of the associated sum of one bit is used as $C_{in}$ for determination of the associated sum of a next bit.

DETAILED DESCRIPTION

Figure 1A:
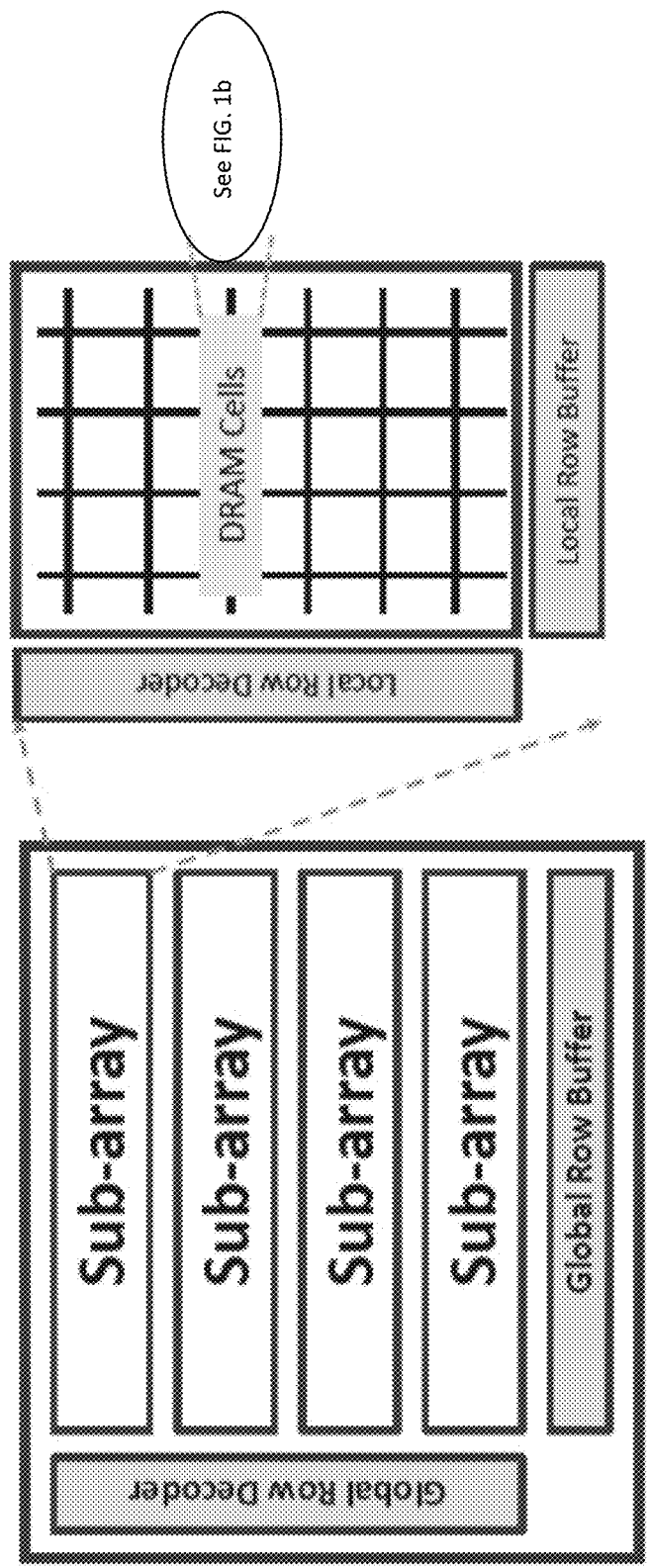
FIG. 1a is schematic of dynamic random access memory (DRAM) bank which includes several sub-arrays and associated peripheral circuits for read and write operations.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is described in the present disclosure to perform simple vector arithmetic operations that is compatible with existing dynamic random access memory (DRAM) architecture with minimum associated latency. Towards this end, an in-DRAM addition primitive using one transistor-one capacitor (1T1C) DRAM technology is presented. The analog nature of DRAM cells is used to perform Boolean majority functions between selected rows in the sub-array without any modifications to the bit-cell or the sense amplifier. A majority function compares the number of 1s and 0s in a set having an odd number of binary numbers and provides an output of a 1 or a 0 depending whether there are more 1s or more 0s, respectively. Afterwards, a majority-based addition mechanism is used to perform full vector addition with negligible area overhead (<1%). Furthermore, we process data in transposed manner, i.e. the two vectors to be added are stored in the same column, to avoid the need for carry shifting. The proposed in-DRAM addition technique provides fast operation with massive parallelism while adding almost zero area overhead.

To achieve these goals, the present disclosure describes three novel developments in this field:

1) A new in-DRAM majority-based arithmetic primitive that adds negligible area overhead (<1%). The proposed DRAM sub-array design is capable of performing additions where the operand vectors are stored in a transposed manner (i.e., the vectors to be added are stored in the same column). Such addition mechanism offers massive parallelism since it eliminates the need to shift carry bits across bit-lines. The sum of two vectors are then calculated using Boolean majority functions performed by activating odd number of DRAM rows simultaneously.

2) A detailed variation analysis is provided using HSPICE to ascertain the robustness of this novel concept. For simulation purposes, TSMC 65 nm technology library is used. Monte Carlo runs show that multiple-row activation works reliably with a worst bit error rate of only 1.67×10'.

3) The energy consumption and latency of this novel in-memory compute primitive is then determined. The novel methodology improves the energy 21.7X compared to reading the same amount of data out of DDR3-1333 DRAM interface. Moreover, we perform a quantitative comparison between the proposed work and state-of-the-art in-DRAM computing accelerators in terms of cell structure, computing mechanism, area overhead, and latency. This novel approach, thus, offers high throughput with very low area overhead.

Figure 1B:
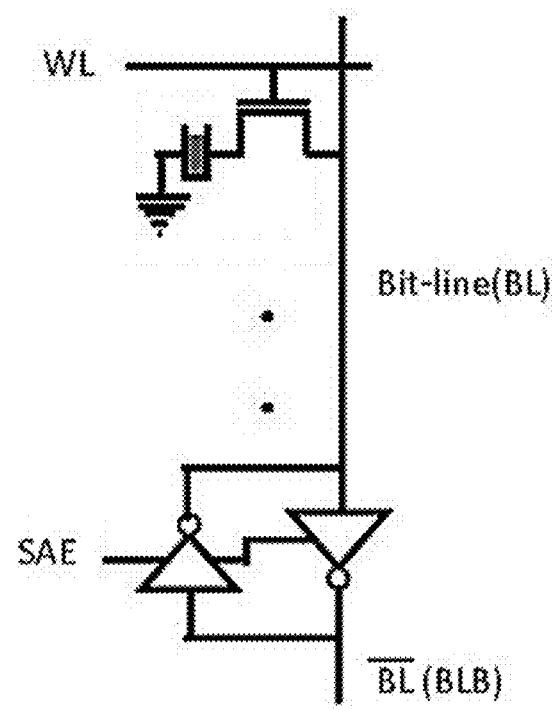
FIG. 1B is a schematic of a DRAM cell which includes a capacitor that stores data as charge and an access transistor which controls access to the stored charge.

Before diving into the details of the novel approach of the present disclosure, some background information is provided to assist in understanding the details. Referring to FIG. 1a, a schematic of a DRAM bank is shown which includes several sub-arrays and associated peripheral circuits for read and write operations (i.e., global buffers and decoders). FIG. 1a shows a plurality of sub-arrays, each with a plurality of DRAM cells. The DRAM cells, as discussed and shown in FIG. 1B, each can be individually accessed by corresponding address lines (WLs and BLs, see FIG. 1B). The DRAM bank of FIG. 1a is also shown with a global row decoder and a global row buffer that can be used to access and hold data from a row of DRAM cells. Each sub-array, as shown in FIG. 1a, is also coupled to a local row decoder and a local row buffer. A sub-array includes several rows of 1T1C bit-cells, a row of sense amplifiers and a row of local decoder. FIG. 1a shows the hierarchical representation of a standard DRAM bank. Referring to FIG. 1B, a schematic of a DRAM cell is shown which includes a capacitor that stores data as charge and an access transistor which controls access to the stored charge. Also shown in FIG. 1B is a sense amplifier which typically includes two cross-coupled inverters with a sense amplifier enable (SAE) signal. The bit-line (BL) is the wire connecting a column of bit-cells to the corresponding sense amplifier, while the wire on the other end of the sense amplifier is referred to as BLB (see FIG. 1B).

To access a data element from a DRAM bank, three commands are typically issued from a memory controller (not shown). Both BL and BLB are maintained at ½ VDD initially in the pre-charged phase. The first command is ACTIVATE which is issued with the row address to be read from. ACTIVATE command raises the word-line (WL) of the corresponding row resulting in connecting (or in a sense copying) the cell capacitor (holding the data) to the bit-line BL. Accordingly, charge sharing between the cell capacitance and bit-line capacitance results in changing BL value to the ½ VDD+$\Delta v$. After charge sharing, the sense amplifier is enabled to detect and amplify the voltage difference between BL and BL ($\Delta v$). Consequently, one end of the sense amplifier reaches 0 and the other reaches VDD depending on the stored data (i.e. the polarity of $\Delta v$—that is if $\Delta v$ is negative, the BL becomes 0 and if $\Delta v$ is positive, the BL becomes 1). Furthermore, the entire row is latched to the corresponding sense amplifier array. It should be noted that each of the cell capacitor is still connected to the BL, thus, the capacitor charge is fully restored during sense amplification. Eventually, a READ/WRITE command is issued to access the data from the local BLs. The column selection logic connects the corresponding local sense amplifiers (local row buffer in FIG. 1a) to the global sense amplifiers (global row buffer in FIG. 1a) through the global bit-lines (not shown). For a read operation, the global sense amplifiers sense the data and pass it to the chip's internal bus. For a write operation, the global sense amplifiers sense the data coming from the chip's internal bus and drive the corresponding local sense amplifiers to the proper data values. To access data from another DRAM row in the same bank, the memory controller issues a PRECHARGE command. PRECHARGE prepares the bank for a read/write operation by lowering all word-lines, disabling all sense amplifiers, and pre-charging both sense amplifier ends (BL and BLB) to ½ VDD voltage level.

With this background of DRAM operation, the present disclosure provides details of the novel approach.

Figure 2:
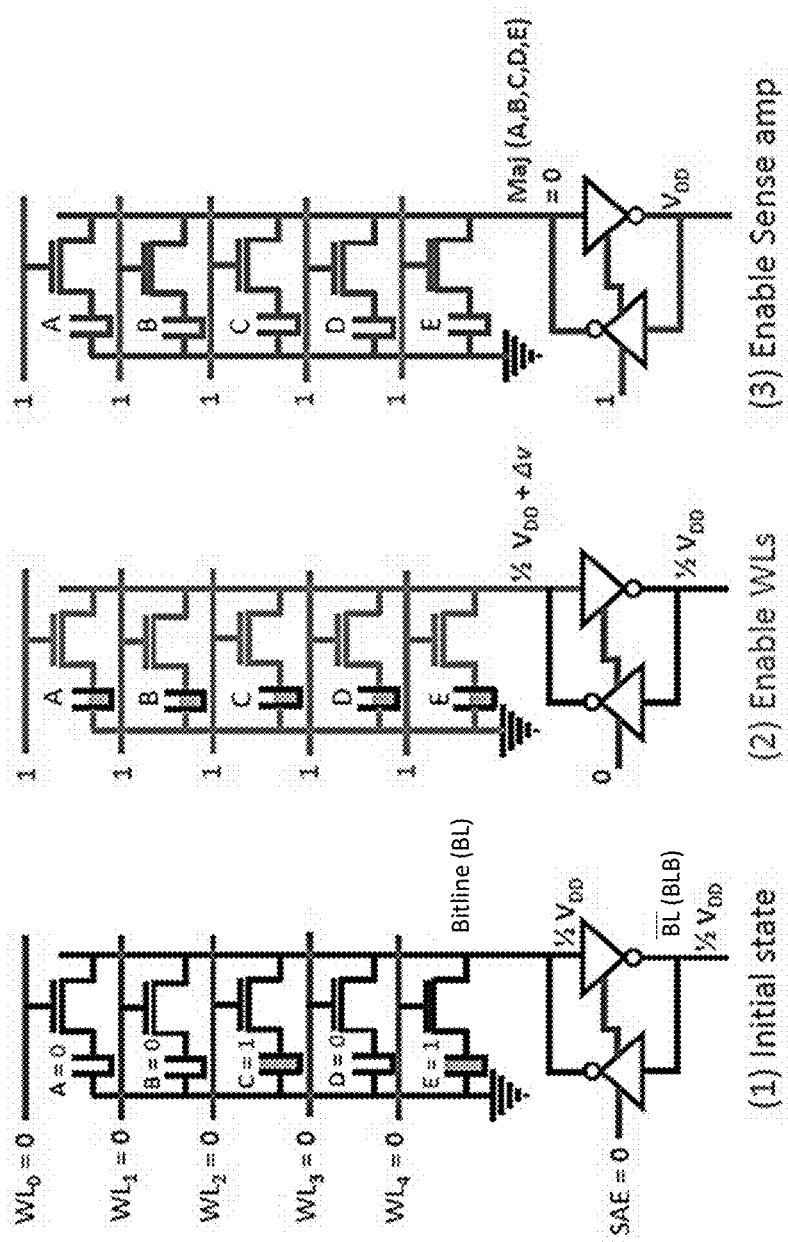
FIG. 2 is a schematic of a plurality of 5 rows of DRAM cells (one DRAM cell in each row), provided in three consecutive states, according to the present disclosure identified as (1) Initial state; (2) Enable WLs; and (3) Enable sense amp.

As shown in FIG. 1B, several DRAM cells share the same bit-line and sense amplifier in one column. To demonstrate the novel approach of the present disclosure, an example of activation of five rows is provided. To accomplish a vector majority operation of five rows storing vector data in the DRAM array, WL of the five rows are activated simultaneously by pulling high of the respective word-lines. This activation is shown in FIG. 2, which is a schematic of a plurality of 5 rows of DRAM cells (one DRAM cell in each row), provided in three consecutive states, according to the present disclosure identified as (1) Initial state; (2) Enable WLs; and (3) Enable sense amp. The combination of states (1) and (2) effectively connects the five respective capacitors from each column to the BL, simultaneously, allowing charge sharing. In the example shown in FIG. 2, the five DRAM cells include two cells which store '1' and three cells which store '0'. Initially, BL and BLB are precharged to ½ VDD. After enabling the word-lines and due to charge sharing, as discussed above the BL value changes to be ½ VDD+Δv. For this particular example, 3 of 5 capacitors store 0V, after charge sharing with the BL capacitance (precharged to ½ VDD), these 3 capacitors would effectively lower the voltage on the BL capacitor. At the same time, 2 of 5 capacitors are storing the voltage VDD, and they would tend to increase the voltage VDD, and they would tend to increase the voltage on the BL capacitor, owing to charge sharing effect. Since there are 3 capacitors trying to decrease the voltage of BL capacitor versus 2 capacitors trying to increase the BL voltage, effectively, the voltage on BL is reduced from its precharged value of ½ VDD to ½ VDD+ 4v, with Δv negative for the case where majority (3 out of 5) bit-cells store zero data. The final step is to enable the sense amplifier by raising SAE so that the sense-amplifier amplifies the negative voltage Δv pulling the BL to 0V, thereby, implementing the majority function of the stored data ('0' in this example). A similar argument can be made for the case where 3 or more bit-cells store data '1' and others store data '0'. In such a scenario Δv would be positive and the final BL value would be '1'. Note, WLs are kept high during sensing to store the majority output value obtained at BL back into the cell capacitors. Alternatively, instead of 5 row activation, other odd number rows can be activated to obtain the majority of the constituent vector data stored in the DRAM cells.

With the mechanism for activation of odd number of rows described, the DRAM-based in-memory adder is now described. The adder design is based on the majority function described above where the carry-out and the sum are computed using majority functions as below:

$$C_{out} = \text{Majority}(A, B, C_{in}) \quad (1)$$

$$S = \text{Majority}(A, B, C_{in}, \overline{C_{out}}, \overline{C_{out}}) \quad (2)$$

where A and B are input elements, $C_{in}$ is the input carry, $C_{out}$ is the output carry, and S is the sum. A carry shift between bits is needed to perform vector addition. The carry shift operation through the bit-lines would increase the addition latency, which as discussed above is a shortcoming of prior art attempts. It should also be noted that the carry shift latency increases with the size of vector operands. However, the present disclosure describes a no-shift addition operation by storing the data in transposed form. This approach to storing and computing mode is referred to herein as bit-serial processing. In a bit-serial mode, a single bit of several data vectors is processed at a single time step which is beneficial if the same operation is performed on the same bit in several vectors. For instance, to add 128 vector pairs each with 16-bit width in a conventional arithmetic unit, 128 steps are needed to complete the operations. In contrast, a bit-serial architecture would require only 16 steps to complete the same operation since it operates based on bit-by-bit instead of element-by-element computations. Therefore, the input vectors A and B are stored in the same column in the DRAM subarray. The least significant bits (LSB) of A and B are added first calculating $S_0$ and $C_{out0}$, then $C_{out0}$ is used as the input carry for the next bit addition $C_{in1}$. It should be noted that the entire vector addition occurs in the same bitline, hence there is no need for carry shift between bit-lines.

Figure 3:
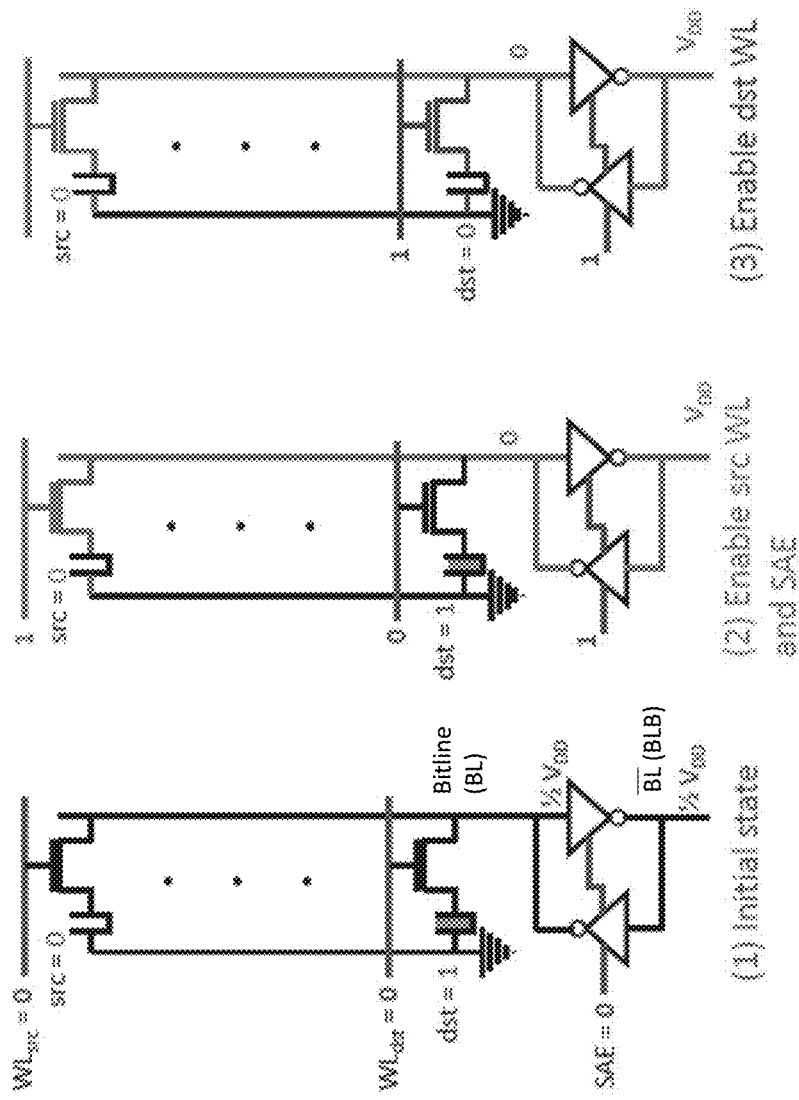
FIG. 3 is a schematic of a plurality of rows of DRAM cells (one DRAM cell in each row), provided in three consecutive states, according to the present disclosure identified as (1) Initial state; (2) Enable source (src) WL and SAE; and (3) Enable destination WL.

Since the multiple-row-activation principle in DRAM is data-destructive, a copy operation is needed from the data rows to a set of reserved-for-compute rows to preserve the source data from said destruction. The reserved rows are assigned at design time; thus, a reserved address can be assigned to the three or five rows where the multiple-row activation occur. A copy mechanism is thus carried out to copy the two bit-operands before performing the majority-based addition. In this approach, data is copied from a source row to a destination row directly in the same DRAM subarray by issuing two consecutive ACTIVATE commands to the source and destination rows. Referring to FIG. 3, which is a schematic of a plurality of rows of DRAM cells (one DRAM cell in each row), provided in three consecutive states, according to the present disclosure identified as (1) Initial state; (2) Enable source (src) WL and SAE; and (3) Enable destination WL. This copy example is shown in FIG. 3. The source bit is 0 while the destination bit is initially set at 1. Therefore, as in FIG. 2, in the first state, the sense amplifier is first precharged by placing ½ VDD on both BL and BLB, while setting WL for both source and destination to 0. In this case, Next, in state (2), WL for the source is set to 1, while WL for the destination is retained at 0, and SAE is also set to 1. Since only WL for the source bit was activated, and it held a 0, BL becomes ½ VDD+Δv, where Δv is negative. This causes BL to become 0 and BLB to become 1. Next, WL for the source is deactivated (i.e., $WL_{src}$=0) and WL for the destination is activated (i.e., $WL_{dst}$=1), while the SAE is maintained at 1. This causes the capacitor of destination to discharge into the sense amplifier and thus become 0 from being a 1, thereby copying the value in the source.

It should be noted that both $C_{out}$ and $\overline{C_{out}}$ need to be stored in two different rows since $C_{out}$ will be used as $C_{in}$ for the next bit addition and $C_{out}$ is used in sum calculation according to (1) and (2). Therefore, we adopt a dualcontact cell approach for storing $\overline{C_{out}}$ after calculating $C_{out}$. The dual-contact cell is a DRAM cell with two access transistors (a 2T1C cell) where one transistor coupled to BL to the cell capacitor controlled by a positive word-line $WL_p$, and the second transistor coupled to BL to the cell capacitor controlled by a negative word-line $WL_n$.

Figure 4:
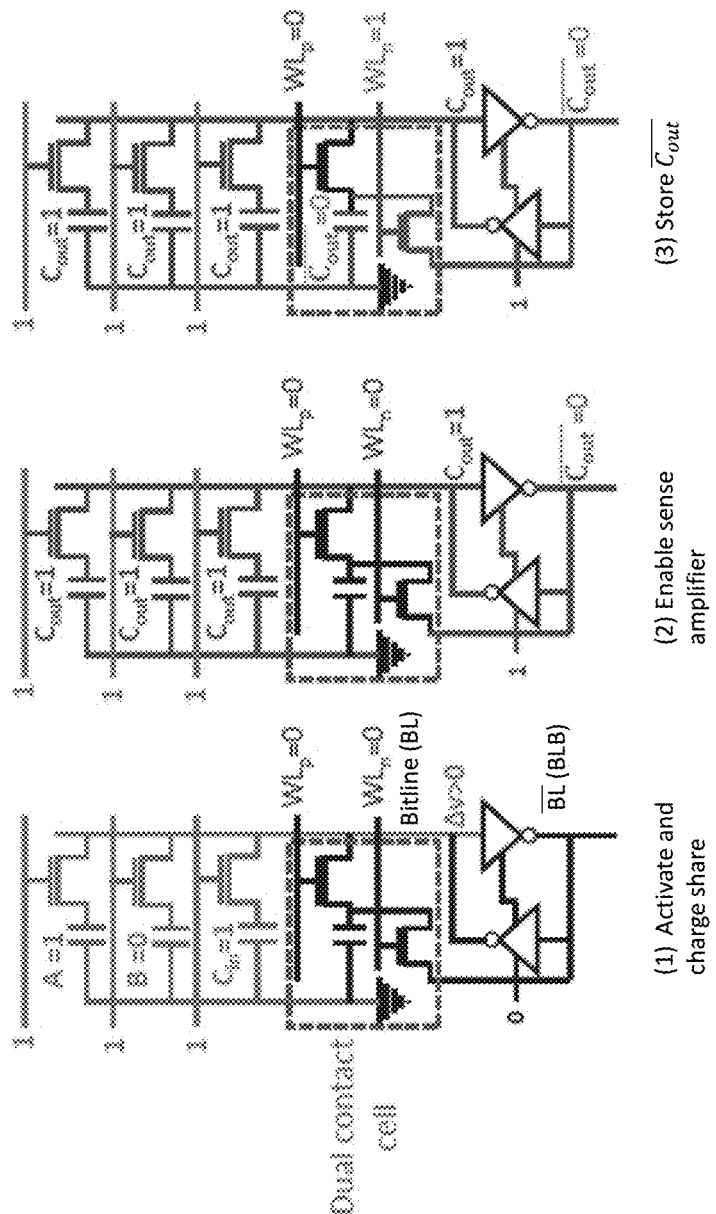
FIG. 4 is a schematic which shows the calculation of the majority function using A, B, and $C_{in}$ to obtain $C_{out}$ and $\overline{C_{out}}$ using a triple row activation and the dual-contact cell mechanisms, provided in three consecutive states, according to the present disclosure identified as (1) Activate and charge share; (2) Enable sense amplifier; and (3) Store $\overline{C_{out}}$.

An example of the operation discussed above is provided in FIG. 4 which is a schematic which shows the calculation of the majority function using A, B, and $C_{in}$ to obtain $C_{out}$ and $\overline{C_{out}}$ using the triple row activation and the dual-contact cell mechanisms, provided in three consecutive states, according to the present disclosure identified as (1) Activate and charge share; (2) Enable sense amplifier; and (3) Store $\overline{C_{out}}$. Here A and $C_{in}$ are both initially at 1 and B is at 0. First, the word-lines of A, B, and $C_{in}$ cells are activated to start the aforementioned charge sharing. The majority function output of 1-0-1 (for A-B-$C_{in}$) is 1. Thus charge sharing results in ½ VDD+Δv where Δv is positive (i.e., Δ>0). This means $\overline{BL}$ is 1 and BL (BLB) is 0. After charge sharing, the sense amplifier is enabled to amplify BL and BL (BLB) to be $C_{out}$ and $\overline{C_{out}}$, respectively. Finally, $WL_n$ is raised to store $\overline{C_{out}}$ in the dual-contact cells. Note, two rows of dual-contact cells are needed to store $\overline{C_{out}}$ twice to perform equation (2).

Figure 5A:
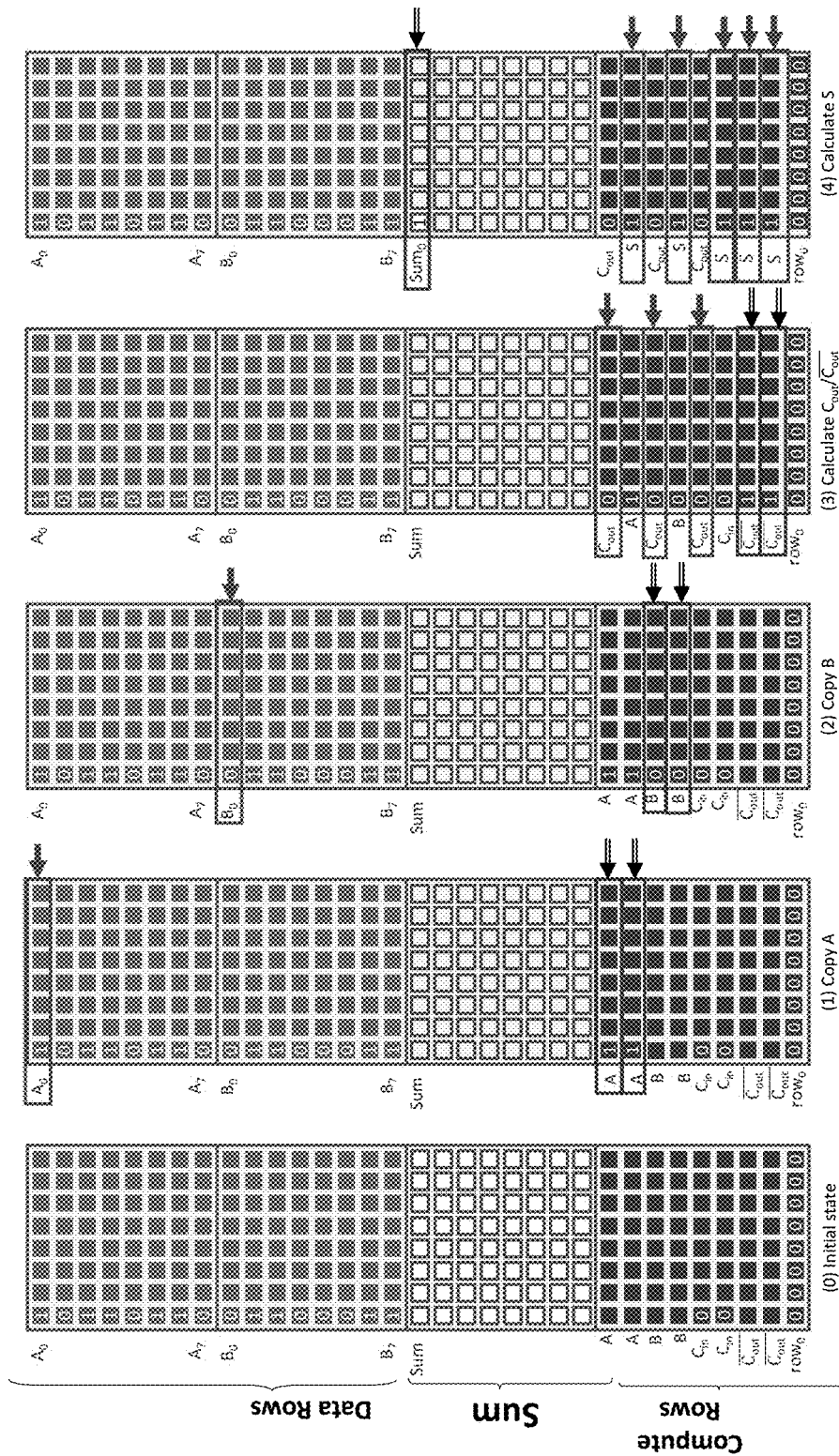
FIGS. 5a, 5b, 5c, and 5d, are schematics of memory shown with of a DRAM subarray having data stored in a transposed layout (i.e., data associated with eight-bit A and B is held in eight consecutive rows), showing a bit-serial operation according to the present disclosure.
Figure 5B:
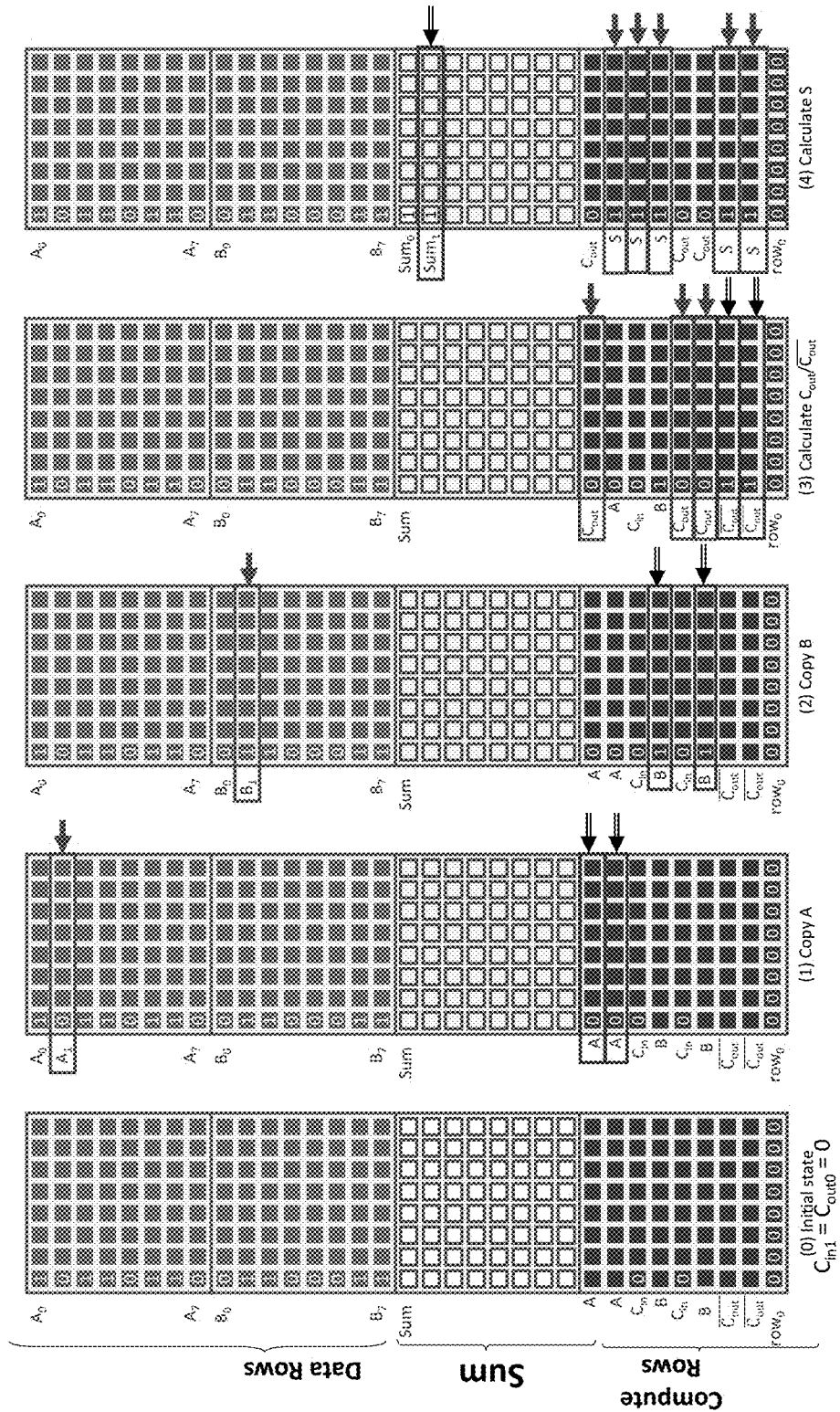
Figure 5C:
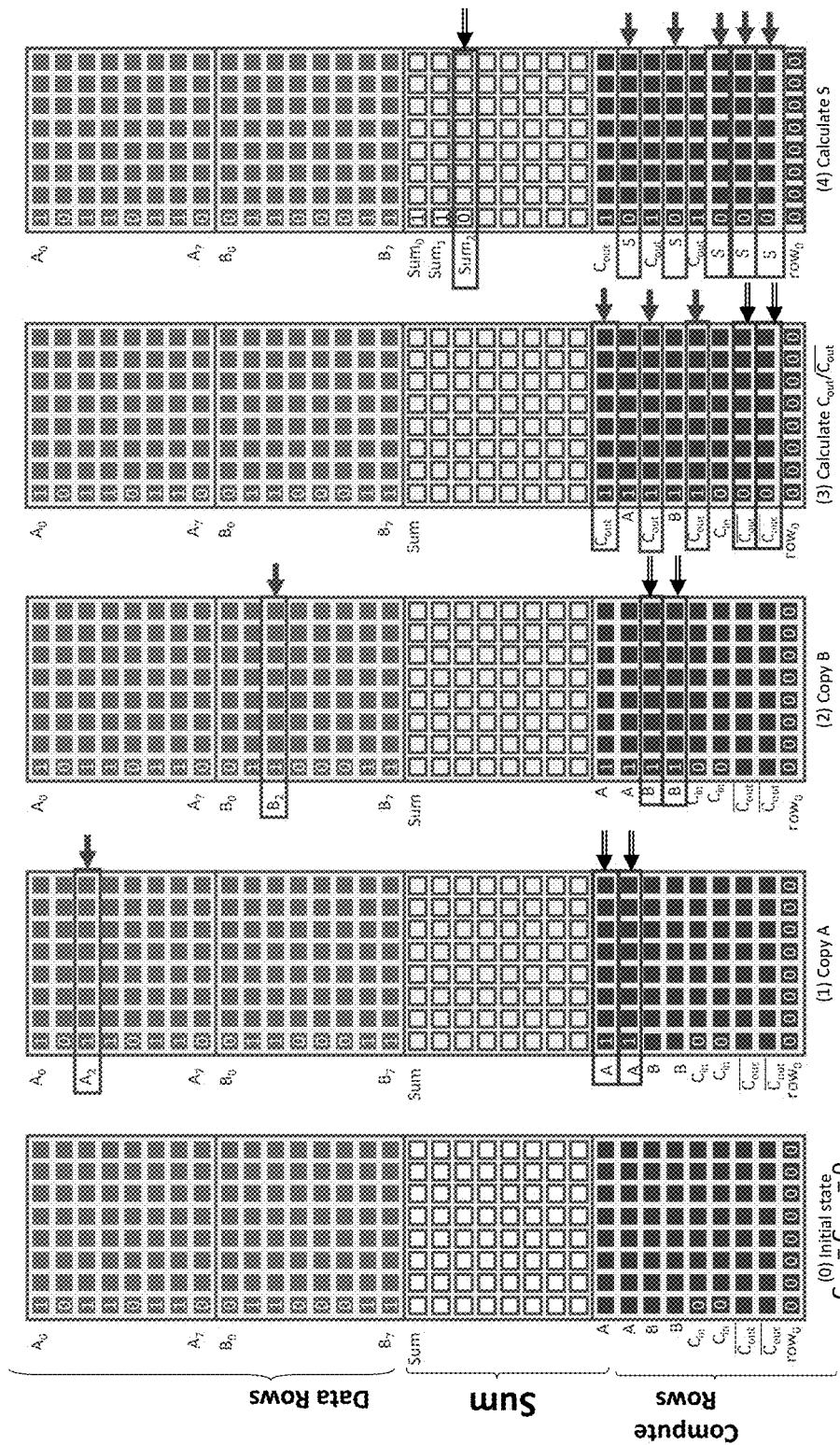
Figure 5D:
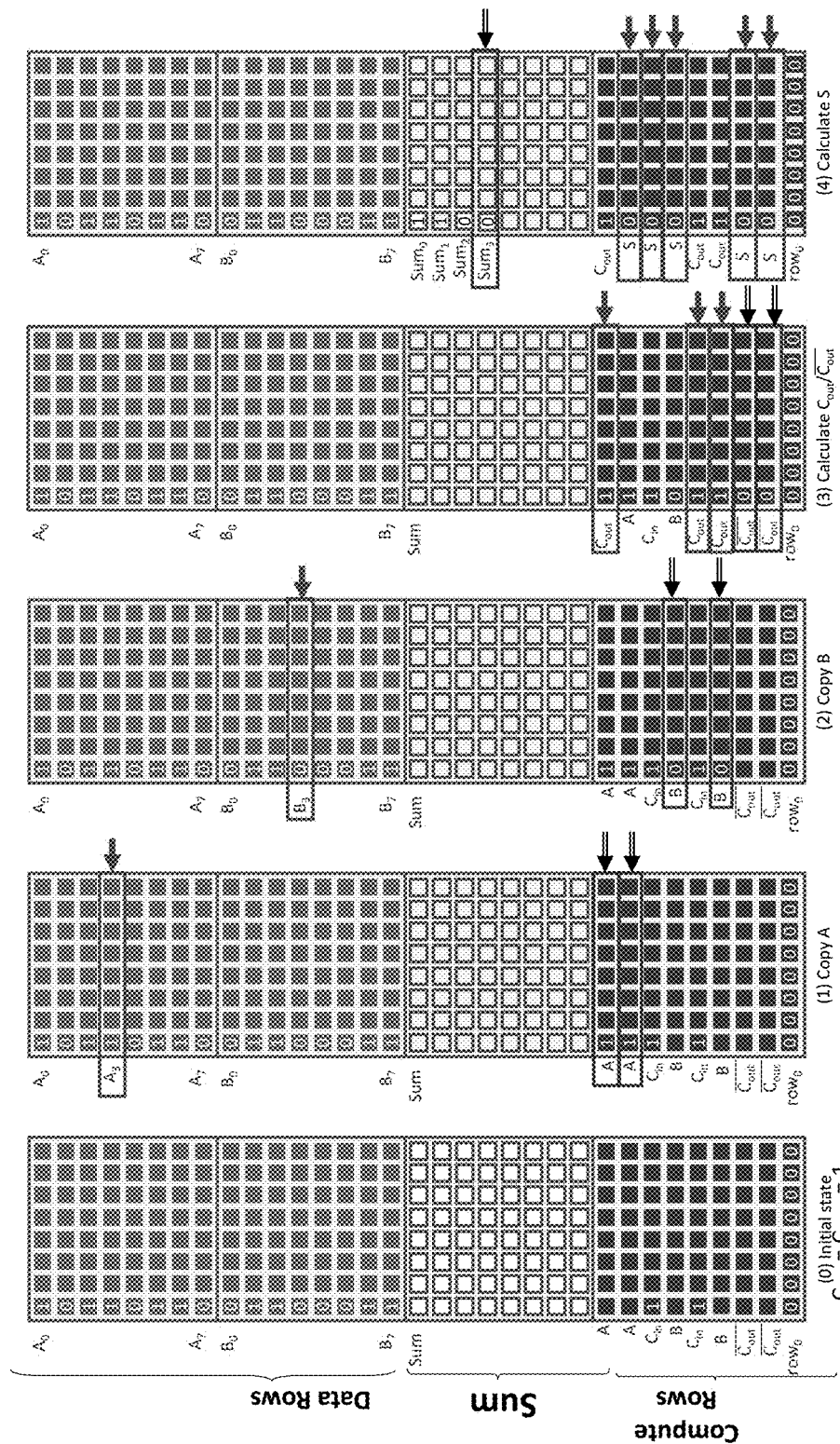

Referring to FIGS. 5a, 5b, 5c, and 5d, a schematic of memory is shown with of a DRAM subarray having data stored in a transposed layout (i.e., data associated with eight-bit A and B is held in eight consecutive rows). Thus, vectors A and B are stored in the first column with each vector comprising 8 bit-cells. These are referred to Data Rows in FIGS. 5a-5d. The rows in the depicted subarray can be categorized with eight compute rows reserved for the addition operation. Vector A resides in the first eight data rows, while B resides in the next eight data rows. These are referred to as Compute Rows in FIGS. 5a-5d. The Compute Rows include two rows of scratchpads for A, 2 rows of scratchpad for B, two rows for $C_{in}$, and two rows for $\overline{C_{out}}$. Additionally, eight data rows are kept empty for the addition result (Sum). These rows are referred to as Sum in FIGS. 5a-5d. At every step, the rows with single arrows in FIGS. 5a-5d are firstly activated for copy or multiple-row activation operations followed by enabling the sense amplifier, as discussed above. Afterwards, the rows with double arrows are activated to perform the corresponding operation. With that, a step-by-step progression of the addition of the first bit of the two vectors A and B is described, as shown in FIGS. 5a-5d. Initially, the $C_{in0}$ rows are storing zero values (since there is no carry-in at the beginning) which can be achieved by copying zeros from a control row storing all zeros always (shown as $row_0$ in FIG. 5a). For each bit (i=0, 1, . . . 7 in this 8-bit example) of A and B, the first addition operation is copying $A_i$ from its data row to the first two rows in the compute rows (labelled A in FIGS. 5a-5d). Similarly, $B_0$ is copied next to the second two rows in the compute rows (labelled B in FIG. 5a). Afterwards, triple-row activation is performed to A, B, and $C_{in}$ as described above, to obtain $C_{out}$ ($C_{out}$=Majority (A, B, $C_{in}$)) while activating the two $\overline{C_{out}}$ rows to store the value of $C_{out}$ needed for calculating the sum. In this example $A_0$ is 1 and $B_0$ is 0. Therefore, $A_0$ (i.e., 1) is placed in the first two rows of Compute Rows, while $B_0$ (i.e., 0) is placed in the next two rows of the Compute Rows, resulting in 1100. Since $C_{in}$ is 0 in the next two rows, $C_{out}$ which is the majority of A, B, and $C_{in}$ (i.e., Majority (100)) is 0 replacing one of each of A, B, and $C_{in}$ rows, leading to $C_{out}$ of 1 which is then placed in the next two rows. Next, A, B, $C_{in}$, and $C_{out}$ and $C_{out}$ rows are activated to calculate and store the sum result (based on S=Majority (A, B, $C_{in}$, $\overline{C_{out}}$, $\overline{C_{out}}$)) in the designated Sum row. In this case, the Majority function is a 5-bit majority function of (1, 0, 0, 1, 1) which is a 1 as the sum. This sum ($Sum_0$) is then written to the Sum rows. Likewise, the same operations will be performed for the next-bit addition making use of the previously calculated $C_{out}$ as $C_{in}$ for the next-bit addition (i.e., $C_{in1}$=$C_{out0}$), as shown in FIG. 5b. That is, first $A_1$ (0) is first copied to its respective rows (00) in the Compute Rows (see FIG. 5b). However, the next row is occupied by $C_{in}$ (remnant of $C_{out}$ from the last bit). This combination of $C_{in}$ and $B_1$ is repeated in the next two rows. Therefore, $B_1$ (1) is copied into alternating next bits (making $A_1$, $A_1$, $C_{in}$, $B_1$, $C_{in}$, B1). Next a new $C_{out}$ is calculated (i.e., $\overline{C_{out}}$=Majority (0, 1, 0)), which is 0, leading to $\overline{C_{out}}$ as 1. The sum is then Majority (0, 1, 0, 1, 1) which is 1. This bit (Sum1) is then written into the appropriate position in the Sum rows. Repeating the same process for bits 2, and 3, results are shown in FIGS. 5c and 5d. One difference is seen in FIG. 5d where $C_{in3}$ is initialized to 1 instead of 0 as $C_{out2}$ from the $A_2$ and $B_2$ resulted in 1.

Note that the reserved rows during the start of the add operation, as shown in FIGS. 5a-5d, are initially arranged in the order {A, A, B, B, $C_{in}$, $C_{in}$, $\overline{C_{out}}$, $C_{out}$}. However, at the end of the first add operation, the sequence of stored data changes to {A, A, $C_{in}$, B, $C_{in}$, B, $\overline{C_{out}}$, $C_{out}$}. In other words, the ordering of the data in the reserved rows changes from {A, A, B, B, $C_{in}$, $C_{in}$, $\overline{C_{out}}$, $C_{out}$} to {A, A, $C_{in}$, B, $C_{in}$, B, $\overline{C_{out}}$, $C_{out}$}. Interestingly, for the next add operation, if we start from the ordering sequence {A, A, $C_{in}$, B, $C_{in}$, B, $\overline{C_{out}}$, $C_{out}$}, the resultant sequence changes to the initial ordering at the start of the first add operation i.e. {A, A, B, B, $C_{in}$, $C_{in}$, $\overline{C_{out}}$, $\overline{C_{out}}$}. Essentially, the ordering sequence toggles between two sequences every other add operation. However, this can be easily taken care by the memory controller, wherein the controller is aware that the ordering sequence changes for every alternate add operation. Interestingly, the described in-memory computing operations are performed at the subarray level, and do not alter the circuits at the global bit-lines. Furthermore, such operations can be mapped to the aforementioned DRAM commands: ACTIVATE, and PRECHARGE. Specifically, a multiple-row activation or a copy operation can be performed by issuing two back-to-back activation commands followed by a precharge (referred to as an 'AAP' operation). The memory controller would send such AAP commands with two addresses to the decoder to perform additions. Specifically, the addition operation of two n-bit vectors needs at least 4n+1 AAP operations (four operations for each bit addition plus an initial copy operation for $C_{in0}$ as shown in FIGa. 5a-5d). To illustrate, in a 512X1024 subarray, 1024 addition operations of two 8-bit vectors takes 33 AAP operations due to the bit-serial configuration.

Notably, the in-DRAM adder architecture of the present disclosure adds only 9 compute rows (two out of nine rows contain dual-contact cells which consume more area) to the regular DRAM subarray, while not changing the sense amplifier. The nine reserved rows are shown in FIGS. 5a-5d and include two rows for storing copies of vector A bit, two rows for vector B bit, two rows for $C_{in}$, two rows for $\overline{C_{out}}$, and one row that is always storing zeros for initialization of the $C_{in0}$ bit. According to, the dual contact row has an area cost that is double the regular row area. Therefore, the overall area overhead due to the compute rows is roughly equivalent to 11 standard rows per subarray which represents<1% of DRAM chip area.

To evaluate the functionality and robustness of the proposed in-DRAM adder, we perform HSPICE circuit simulations using TSMC 65 nm PDK. All DRAM cells and subarray parameters are adopted from the Rambus power model, and shown in table I, provided below.

TABLE I

| DRAM SUBARRAY PARAMETERS | |
|---|---|
| Technology | TSMC 65 nm |
| Cell Capacitance | 24 fF |
| Subarray size | 512 × 1024 |
| Bit-line Capacitance | 85 fF |
| Access Transistor W/L | 120 nm/185 nm |
| Supply Voltage $V_{DD}$ | 1.2 V |
| Capacitance Variation | 5% |

Figure 6:
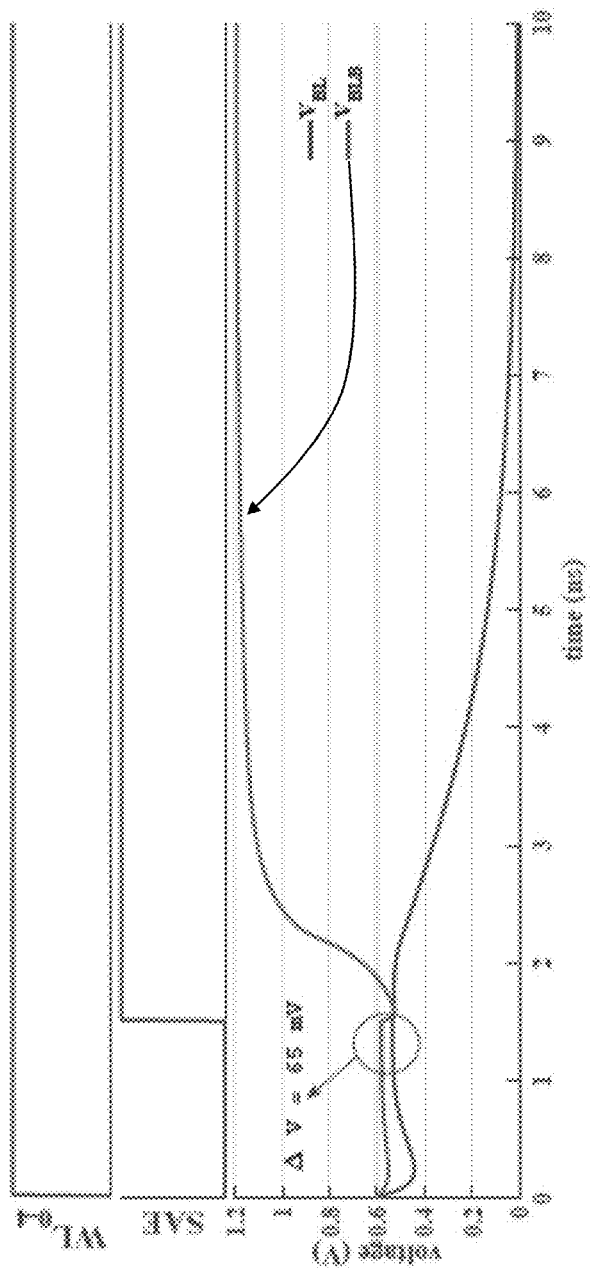
FIG. 6 is a graph of voltage vs. time in ns which shows example transient waveforms of a quintuple-row activation example operation, where three of the five activated bit-cells store '0' data values, while the other two bit-cells store '1' as illustrated in FIG. 2.

Referring to FIG. 6 a graph of voltage vs. time in ns is provided which shows transient waveforms of a quintuple-row activation example operation. In this example, three of the five activated bit-cells store zero data values, while the other two bit-cells store I' as illustrated in FIG. 2. The activation command starts by raising the five word-lines to allow the charge sharing process. Afterwards, the sense amplifier is enabled (SAE is raised) while keeping the word-lines raised to amplify Δv to be either 0V or $V_{DD}$. Therefore, the bit-line voltage represents the majority function, and $V_{\overline{BL}}$ represents the inversion of the majority of the data stored in the five enabled bit-cells. Note, the voltage difference between BL and $\overline{BL}$ (Δv) is typically 65 mV in quintuple-row activation according to FIG. 6. Subsequently, we perform rigorous Monte Carlo simulations to study effect of process variations on the multiple-row activation operations. It is worth noting that since all the multiple-row activation operations are performed after a copy, the proposed mechanism does not suffer from data retention or cell leakage issues.

Figure 7:
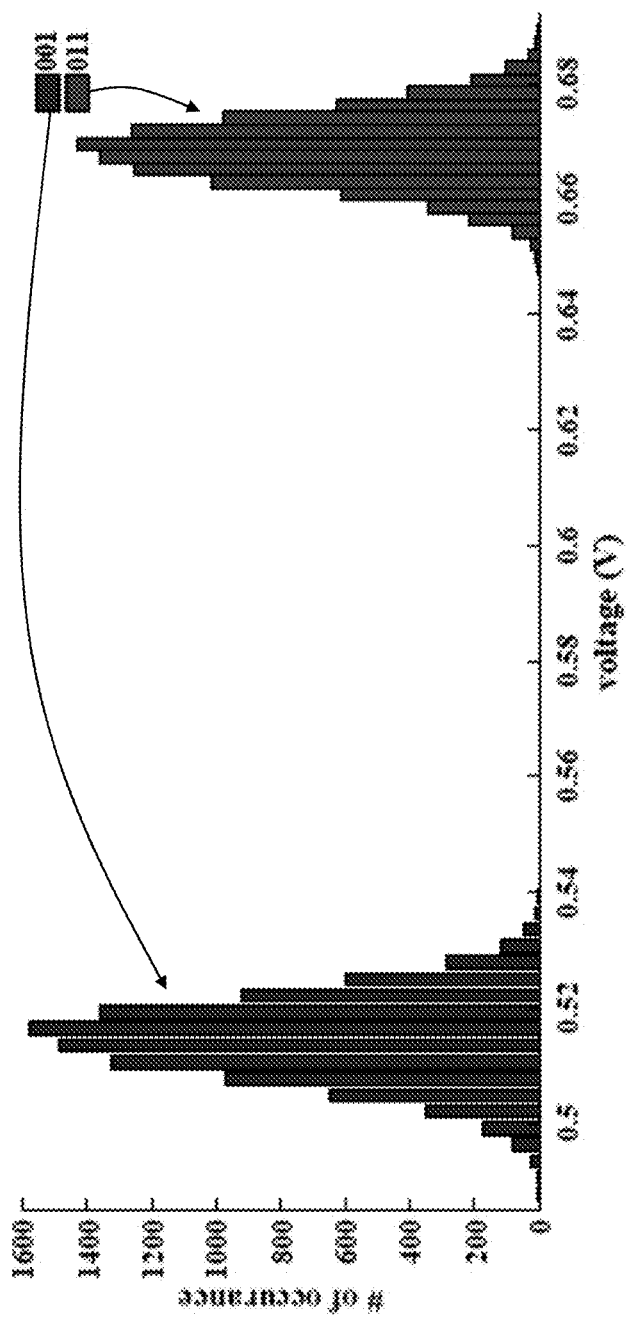
FIG. 7 is a histogram of voltage, which shows a statistical distributions of BL at the charge sharing phase before enabling SAE during a triple-row activation operation at data sets '001', and '011'.

In the Monte Carlo runs, transistor variations are applied through TSMC 65 nm PDK, while cell capacitors are assumed to have 5% variations as mentioned in table I. Referring to FIG. 7, which is a histogram of voltage, a statistical distributions of BL at the charge sharing phase before enabling SAE during a triple-row activation operation at data sets '001', and '011' is shown. Note, '001' and '011' data sets are the most data cases prone to variation errors since they are the closest to threshold according to equation (1). According to FIG. 7, the mean-to-mean difference between $BL_{001}$ and $BL_{011}$ is 150 mV resulting in a sense margin of at least 75 mV. It is worth mentioning that there are four possible combinations of the data stored in three bit-cells from '000' to '111', and only the distributions of '001' and '011' are shown since '000' and '111' are farther away from the sense amplifier threshold which is ½ VDD. Therefore, the triple-row activation works reliably, and provides robust majority results with zero failures in 100,000 runs.

Figure 8:
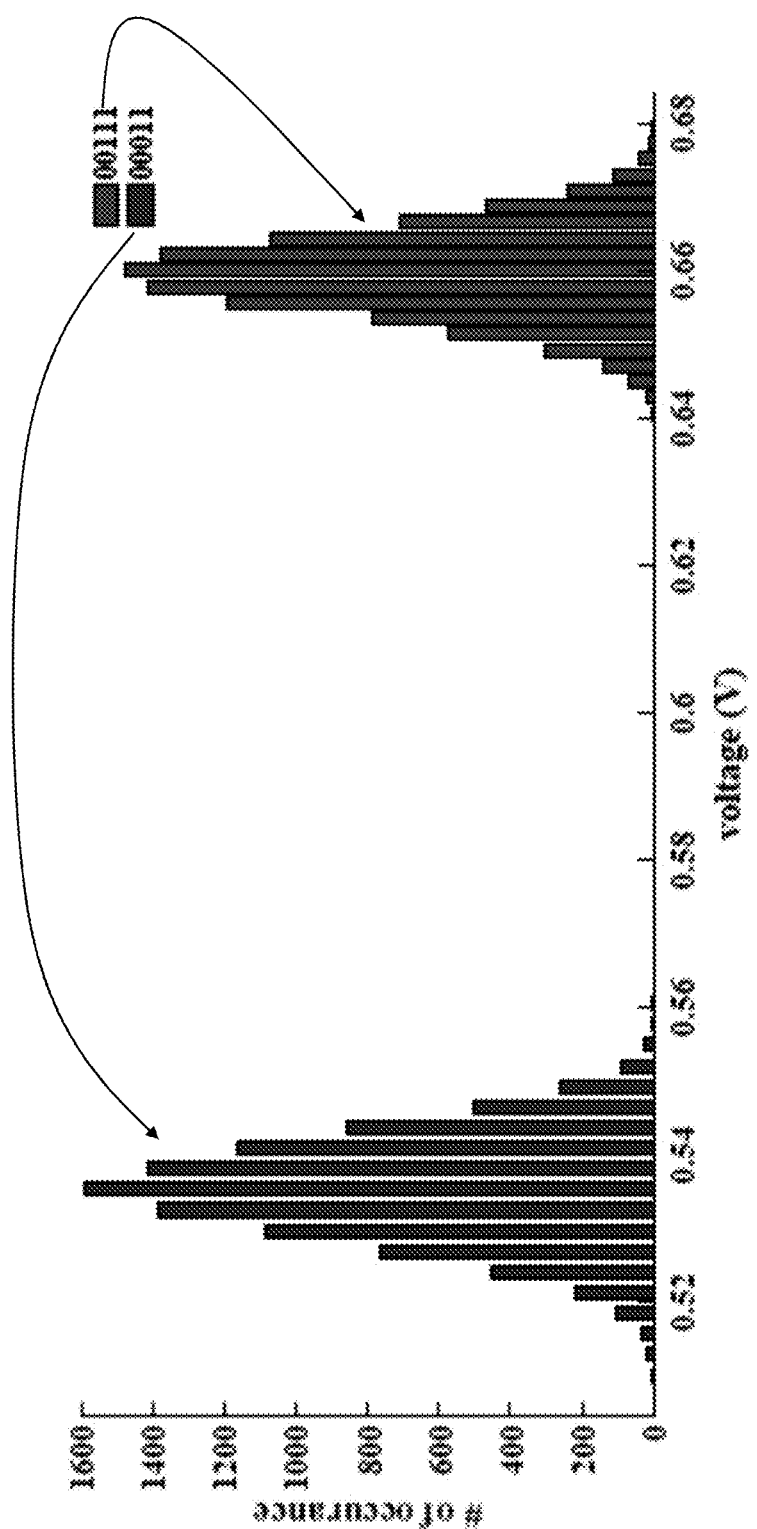
FIG. 8 is another histogram of voltage, which shows a statistical distributions of BL at the charge sharing phase during the quintuple-row activation operation at '00011' and '00111' data sets, since they are the most prone to variation errors.
Figure 9:
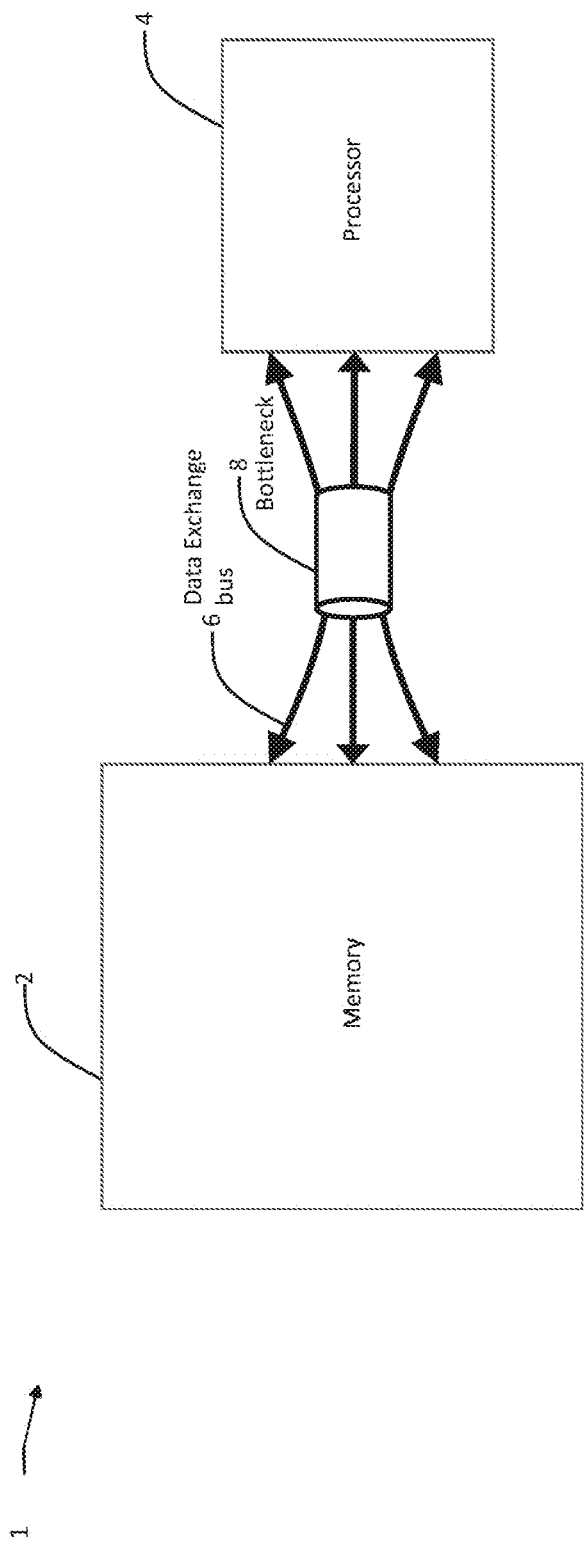
FIG. 9 is a block diagram showing the classical von-Neumann bottleneck between a processor and a memory.

Similarly, FIG. 8, which is another histogram of voltage, shows the statistical distributions of BL at the charge sharing phase during the quintuple-row activation operation at '00011' and '00111' data sets, since they are the most prone to variation errors. From FIG. 8, the mean-to-mean distance between '00011' and '00111' is 130 mV resulting in a sense margin of at least 65 mV, Furthermore, the possible data combinations are six data sets from '00000' to '11111'. We only show the distributions of the two data sets with the most error probability, while the rest of data set combinations are more robust. Typically, we observe an error rate as low as $1.67 \times 10^{-6}$ during 100,000 Monte Carlo runs. This ensures the reliability of the proposed triple- and quintuple-row activation operations. As a result, we emphasize the robustness of the proposed in-DRAM adder against process variations.

To estimate the energy consumption of the proposed addition operation in DRAM, we modified the CACTI tool based on data from the circuit simulations of row copy and multiple-row activation operations from HSPICE. CACTI is adopted to model a 1 GB (Gigabytes) DDR3-1333 bank in 65 nm technology with a subarray size of 512×1024. We compare the energy consumption of the proposed vector addition operation in DRAM with reading the same amount of data out from DRAM using DDR3 interface. Table II presents the energy consumed per kilo-byte to read data out of the DRAM, and the energy consumed by the proposed in-DRAM addition scheme (8-bit addition is assumed). The addition energy associated with our work is the sum of the energy of the copy and multiple row activation operations. Note, there is a 21.7X improvement in energy consumption between the proposed primitive and normal memory read in DDR3.

TABLE II

The statistical distributions of BL during quintuple-row activation and charge sharing at '00011' and '00111' data sets

| | Energy (nJ/KB) | Energy Improvement |
|---|---|---|
| Normal Read | 547.8 | 1× |
| In-DRAM Addition | 26.5 | 21.7× |

Furthermore, we compared the proposed scheme to the previously reported in-DRAM computing schemes, DrAcc and DRISA of the prior art. DRISA proposed multiple computing primitives, including addition, using different cell structures. DRISA adopted both the standard 1T1C cell and 3T1C cell accompanied with different peripheral logic blocks. Specifically, DRISA offered four different in-memory computing solutions: 3T1C, 1T1C-NOR, 1T1C-mixed, and 1T1C-add. Note, The 3T1C cell is 5X more area than the standard 1T1C cell. In the 3T1C variant, the adopted DRAM cells are 3T1C with decoupled read and write ports for computing purposes. 1T1CNOR/mixed/add are 1T1C-based solutions accompanied with NOR logic, mixed logic blocks (NAND, NOR, XNOR, and INV), or an adder circuitry that are attached to the local sense amplifiers, respectively. DrAcc introduced a low-cost carry look-ahead addition operation in DRAM built on-top of Ambit bit-wise operations. Table II shows a comparison between the proposed in-memory addition solution, DrAcc, and DRISA in terms of cell structure, the peripheral circuitry, addition logic, area overhead, and number of operations needed for addition. All the compared schemes are assumed to be applied to a DRAM chip with a 512×1024 subarray. DRISA-1T1Cadd solution seems to be the fastest in-DRAM adder, however, its area overhead is almost 2X the standard DRAM area. Moreover, DRISA-1T1C-add incorporates a full adder circuit in the peripheral circuitry which might not be process-friendly since standard DRAM process technologies do not support complex logic circuits. DrAcc offers low area cost (2%), yet, the associated addition latency is high. Typically, the proposed scheme is 3.15X faster than DrAcc. Needless to say that the proposed adder offers fast addition operation with the lowest area overhead (<1%) and minimal changes to the commodity DRAM chip.

TABLE III

A comparison between the in-dram adder of the present disclosure and DRACC and DRISA approaches of the prior art in terms of cell structure, peripheral changes, addition logic type, area overhead, and no. of cycles needed for addition operation.

| | DRISA | | | | DrAcc | This Work |
|---|---|---|---|---|---|---|
| Cell Structure | 3T1C | 1T1C-NOR | 1T1C-mixed | 1T1C-add | 1T1C | 1T1C |
| Changes in the Peripheral Circuitry | no changes | NOR Logic | NAND, NOR, XNOR, and INV | Adder Circuit | Modified SA | no changes |
| Addition Logic | | | Carry-Save Adder | | Carry Look-ahead Adder | Majority-based Adder |
| Area Overhead | 108%[1] | 77%[1] | 110%[1] | 193%[1] | 2% | <1% |
| No. of Operations for 1024 8-bit Additions | 136 | 128 | 120 | 2 | 104 | 33 |

Thus, the in-DRAM addition technique of the present disclosure provides a massively-parallel bit-serial addition operation inside commodity DRAM cells with a negligible area overhead. It is worth noting that this in-memory technique can generally be adopted to any DRAM technology such as 3D-stacked DRAM and embedded DRAM. Accordingly, this in-DRAM computing primitive can be exploited to tackle the known von-Neumann bottleneck that occurs in modern applications with rapidly-growing data sets like machine learning, neural networks, etc. Since it has the ability to perform vector addition, the proposed primitive can be utilized to do in-memory subtraction, multiplication, or any other arithmetic operations needed for such applications.

Those having ordinary skill in the art will recognize that numerous modifications can be made to the specific implementations described above. The implementations should not be limited to the particular limitations described. Other implementations may be possible.

The invention claimed is:

1. An in-memory vector addition method for a dynamic random access memory (DRAM), comprising:
   consecutively transposing two numbers across a plurality of rows of the DRAM, each number transposed across a fixed number of rows associated with a corresponding number of bits;
   assigning a plurality of compute rows in the same transpose manner including
      two consecutive bits for each bit of each number being added,
      two consecutive bits for carry-in ($C_{in}$), and
      two consecutive bits for carry-out-bar ($\overline{C_{out}}$);
   assigning a plurality of bits in the same transpose manner to hold results as a sum of the two numbers;
   for each bit position of the two numbers:
      determining associated sum(S) of the associated bit positions of the two numbers; and
      placing the determined associated sum in the associated bit of the sum,
      wherein the determination of the associated sum is based on determining a $C_{out}$ and $\overline{C_{out}}$ and recording the determined $C_{out}$ and $\overline{C_{out}}$ in associated bit positions of the plurality of compute rows, and
      wherein $C_{out}$ associated with determination of the associated sum of one bit is used as $C_{in}$ for determination of the associated sum of a next bit.

2. The method of claim 1, wherein:
   determination of the $C_{out}$ is based on:

$C_{out}$=Majority($A,B,C_{in}$)

where A and B, each represent a corresponding bit position being summed of the two numbers, wherein Majority represents a majority function, and
   determination of the Sis based on:

$S$=Majority ($A,B,C_{in}, \overline{C_{out}}, \overline{C_{out}}$).

3. The method of claim 2, wherein for one of even and odd bit positions of the two numbers in the transposed disposition in the DRAM, order of bits in the plurality of compute rows is A, A, B, B, $C_{in}$, $C_{in}$, $\overline{C_{out}}$, $\overline{C_{out}}$, and for another one of even and odd bit positions of the two numbers in the transposed disposition in the DRAM, order of bits in the plurality of compute rows is A, A, $C_{in}$, B, $C_{in}$, B, $\overline{C_{out}}$, $\overline{C_{out}}$.

4. The method of claim 3, wherein the plurality of compute rows records the $C_{out}$ based on a first order: $C_{out}$, A, $C_{out}$, B, $C_{out}$, $C_{in}$, $\overline{C_{out}}$, $\overline{C_{out}}$.

5. The method of claim 4, wherein the plurality of compute rows records the $C_{out}$ based on a second order: $C_{out}$, A, $C_{in}$, B, $C_{out}$, $C_{out}$, $\overline{C_{out}}$, $\overline{C_{out}}$.

6. The method of claim 5, wherein the plurality of compute rows records the associated sum based on a third order $C_{out}$, S, $C_{out}$, S, $C_{out}$, S, S, S.

7. The method of claim 6, wherein the plurality of compute rows records the associated sum based on a fourth order $C_{out}$, S, S, S, $C_{out}$, $C_{out}$, S, S.

8. The method of claim 2, wherein the $C_{out}$ is determined based on a triple row activation of A, B, $C_{in}$.

9. The method of claim 3, wherein the S is determined based on a quintuplet row activation of A, B, $C_{in}$, $\overline{C_{out}}$, $\overline{C_{out}}$.

10. The method of claim 1, wherein the plurality of compute rows further includes a row having all zeros utilized to initialize $C_{in}$ at an initial step of determining $C_{in}$.

11. A dynamic random access memory (DRAM) capable of in-memory vector addition, comprising:
   a DRAM comprising a data addition area having a plurality of rows, each row including a plurality of columns;
   a first subset of the plurality of rows of the data addition area assigned to hold consecutively transposed two numbers across a first column, each number transposed across a fixed number of rows of the first subset associated with a corresponding number of bits;
   a second subset of the plurality of rows of the data addition area assigned as summation result rows across the first column associated with a sum of the two numbers;
   a third subset of the plurality of rows of the data addition rows area assigned as a plurality of compute rows across the first column including two consecutive bits for each bit of each number being added, two consecutive bits for carry-in ($C_{in}$), and two consecutive bits for carry-out-bar ($C_{out}$); and
   a memory controller configured to:
      for each bit position of the two numbers:
         determine associated sum(S) of the associated bit positions of the two numbers; and
         place the determined associated sum in the associated bit of the sum,
         wherein the determination of the associated sum is based on determining a $C_{out}$ and $\overline{C_{out}}$ and recording the determined $C_{out}$ and $\overline{C_{out}}$ in associated bit positions of the plurality of compute rows, and
         wherein $C_{out}$ associated with determination of the associated sum of one bit is used as $C_{in}$ for determination of the associated sum of a next bit.

12. The DRAM of claim 11, wherein:
   determination of the $C_{out}$ is based on:
   $C_{out}$=Majority (A, B, $C_{in}$), where A and B, each represent a corresponding bit position being summed of the two numbers, wherein Majority represents a majority function, and
   determination of the Sis based on:

$S$=Majority ($A,B,C_{in}, \overline{C_{out}}, \overline{C_{out}}$).

13. The DRAM of claim 12, wherein for one of even and odd bit positions of the two numbers in the transposed disposition in the DRAM, order of bits in the plurality of compute rows is A, A, B, B, $C_{in}$, $C_{in}$, $\overline{C_{out}}$, $\overline{C_{out}}$, and for another one of even and odd bit positions of the two numbers in the transposed disposition in the DRAM, order of bits in the plurality of compute rows is A, A, $C_{in}$, B, $C_{in}$, B, $\overline{C_{out}}$, $\overline{C_{out}}$.

14. The DRAM of claim 13, wherein the memory controller records the $C_{out}$ based on a first order: $C_{out}$, A, $C_{out}$, B, $C_{out}$, $C_{in}$, $\overline{C_{out}}$, $\overline{C_{out}}$.

15. The DRAM of claim 14, wherein the memory controller records the $C_{out}$ based on a second order: $C_{out}$, A, $C_{in}$, B, $C_{out}$, $C_{out}$, $\overline{C_{out}}$, $\overline{C_{out}}$.

16. The DRAM of claim 15, wherein the memory controller records the associated sum based on a third order $C_{out}$, S, $C_{out}$, S, $C_{out}$, S, S, S.

17. The DRAM of claim 16, wherein the memory controller records the associated sum based on a fourth order $C_{out}$, S, S, S, $C_{out}$, $C_{out}$, S, S.

18. The DRAM of claim 12, wherein the memory controller determines $C_{out}$ based on a triple row activation of A, B, $C_{in}$.

19. The DRAM of claim 13, wherein the memory controller determines S based on a quintuplet row activation of A, B, $C_{in}$, $\overline{C_{out}}$, $\overline{C_{out}}$.

20. The DRAM of claim 11, wherein the plurality of compute rows further includes a row having all zeros utilized to initialize $C_{in}$ at an initial step of determining $C_{in}$.

* * * * *